United States Patent [19]

Poppe et al.

[11] 3,754,266

[45] Aug. 21, 1973

[54] DIRECTION FINDER AUTOMATIC CALIBRATION UPDATING CONTROL SYSTEM

[75] Inventors: Dag Poppe, Gjettum; Odd Mathiesen, Oslo; Gunnar Viggo Odegaard, Simensbraten, all of Norway

[73] Assignee: International Standard Electric Corporation, Nw York, N.Y.

[22] Filed: Dec. 22, 1971

[21] Appl. No.: 210,870

[30] Foreign Application Priority Data

Dec. 23, 1970 Norway .............................. 4929/70

[52] U.S. Cl. .................. 343/119, 343/114, 343/120

[51] Int. Cl. .............................................. G01s 3/06

[58] Field of Search .................... 343/119, 120, 114

[56] References Cited

UNITED STATES PATENTS 2,473,491 6/1969 Posthumus .......................... 343/120

2,977,588 3/1961 Korman .......................... 343/119 X

*Primary Examiner*—Benjamin A. Borchelt

*Assistant Examiner*—Richard E. Berger

*Attorney*—C. Cornell Remsen, Jr., Thomas E. Kristofferson et al.

[57] ABSTRACT

An updating control system for two channel direction finders which includes dual loop antennas and a sense antenna; and circuits for setting the direction finder to a "Frequency" condition during which the direction finder may be tuned to a new frequency and to a "Bearing" condition in which bearings corresponding to the new frequency are taken. Individual amplifying means are provided to connect each of the two loop antennas to a plate pair of a cathode ray tube. Circuits are also shown for updating (adjusting) the phase and gain of the two signals, and for interconnecting the inputs of the two amplifiers during the updating process and for instrumenting correction of quadrantal errors.

8 Claims, 12 Drawing Figures

PATENTED AUG 21 1973 3,754,266

DIRECTION FINDER AUTOMATIC CALIBRATION UPDATING CONTROL SYSTEM

CROSS REFERENCE TO RELATED APPLICATION

This application is filed under the provisions of 35 U.S.C. 119 with claim for the benefit of the filing of an application covering the same invention filed on Dec. 23, 1970, Ser. No. 4929/70 in Norway.

BACKGROUND OF THE INVENTION

1. Field of the Invention

The invention relates generally to electronic direction finding equipment, and more particularly to automatic gain and phase calibration circuits therefor.

2. Description of the Prior Art

Direction finding equipment of the dual channel type ordinarily employs a pair of loop antennas (90° staggered) and a sense reference antenna. Two channels of reception are accordingly employed and each contains amplifying means, the gain and phase characteristics of which can be a source of error if allowed to drift or remain uncalibrated during operation.

In two channel direction finders of the described type, it has been common practice for many years to update or adjust the gain of the two amplifiers to equa'ity before bearings are taken. When the outputs from these two amplifiers are applied to individual plate pairs of a cathode ray tube, the amplification of one of the amplifiers may simply be adjusted until a line appears at 45° on the cathode ray tube. This process is described (page 886) in the well-known "Radio Engineers' Handbook," by Fredrick E. Terman, 1943. Furthermore, it is desirable and well-known to compensate for the so-called quadrantal error. This is also described in the same textbook (page 872) and by P. C. Sandretto in his book "Electronic Avigation Engineering," 1958 (pages 55–56).

Various circuits for updating the phase of two signals by using the phase of one of the signals as reference are also known. In prior direction finder art, the updating (calibration) of gain and phase are performed in separate time intervals manually by operation of certain control knobs or dials.

It will be evident that such a manual updating process is relatively time consuming and sometimes introduces uncertainties in the bearing presentation.

SUMMARY OF THE INVENTION

An important feature of the invention is that the updating is performed continuously when the direction finder is in its "Frequency" condition and periodically in its "Bearing" condition, in both cases under control of a sequence control unit.

By this arrangement there is obtained a direction finder which may be switched to its "Bearing" condition as soon as the tuning has been completed, because the equipment is being updated continuously as the operator moves the tuning knob. When the operator has completed the tuning and identified the signal, the gain and phase of the new signal will have been fully updated in the short time before his hand reaches the "Bearing" switch. When the direction finder is in its "Bearing " condition, bearing information, and nothing else, will be displayed on a cathode ray tube and on a companion digital display unit. In the device of the present invention, uncertainties inherent in prior updating processes are eliminated and the time required for effecting the calibration updating is substantially reduced.

According to a further feature of the invention, the phase and gain updating processes are effected simultaneously during time intervals determined by a sequence control unit which is controlled by the means for setting the direction finder to "Frequency" and "Bearing." Furthermore, the phase and gain updating processes are performed automatically under control of the sequence control unit, via individual circuits which have no effect on each other.

The aforementioned and other features and objects of the present invention will be understood from the following detailed description of embodiments of the invention, taken in conjunction with the drawings.

DESCRIPTION OF THE PREFERRED EMBODIMENT

Figure 1:
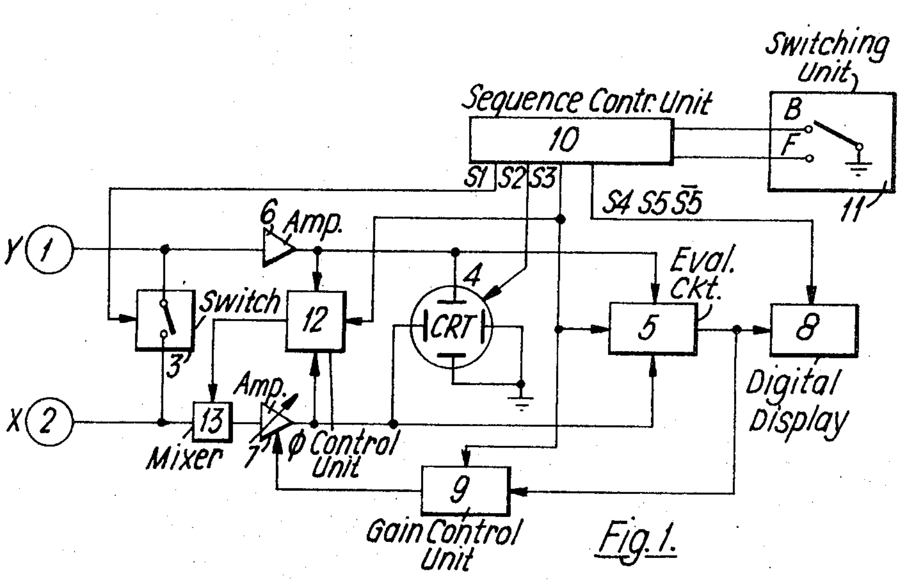
FIG. 1 shows a schematic block diagram of a calibration updating system according to the present invention.

Referring now to FIG. 1, the block diagram of the direction finder according to the present invention will be described.

Signals Y and X are detected by two loop antennas 1 and 2 and passed via tuned amplifiers 6 and 7 respectively. These signals will hereinafter be called Y and X when referred to as they pass through the amplifiers, are displayed on a cathode ray tube (CRT) 4, and are compared in a signal evaluation circuit 5.

Figure 1A:
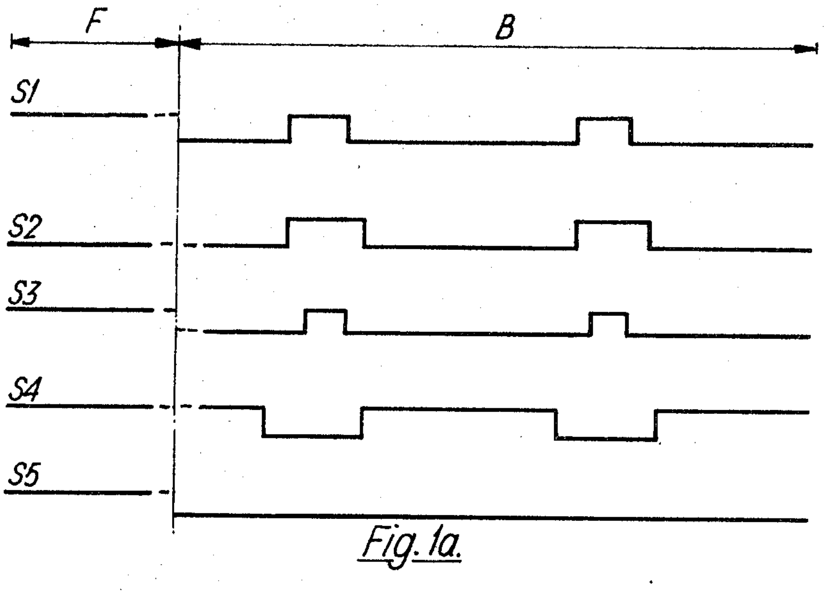
FIG. 1*a* illustrates the sequential control pulses typical of the device of FIG. 1.

When bearings are taken, the bearing (including quadrantal error correction) is displayed on the CRT 4 and also on a digital display 8. The phase and the gain of the circuitry is automatically updated. The gain updating process is taken care of by a gain control unit 9 and includes predetermined compensation for quadrantal error. The so-called quadrantal error is a fixed angular value for each bearing quadrant, but may vary between quadrants. The phase updating process is performed by a phase control unit 12 which controls a mixer 13. A sequence control unit 10 is provided for controlling the various units during updating and during bearings determinations. A switching unit 11 is provided for setting the direction finder to a "Frequency" (F) condition, in which condition the equipment may be tuned (by operating a tuning knob or dial, not shown) to the desired frequency, or to a "Bearing" (B) condition in which bearing determinations are made. This manual switch 11 controls the sequence control unit 10 to deliver control signals S1, S2, S3, S4 and S5, which are indicated and identified in the pulse diagram, FIG. 1a. It will be noted that, in the F-condition, the output signals from the control unit 11 are constant, meaning that the phase and gain is updated continuously, whereas in the B-condition, the control signals S1–S4 comprise a periodic set of pulses. It should be noted that while the switch 11 normally is manually operated, it may be interconnected mechanically or electrically with the tuning control (not shown), such that if the tuning control is operated when the direction finder is set to its Bearing determining condition, the direction finder is automatically set back to the Frequency condition. However, the tuning control would not be operated when the direction finder is in its B-condition. The first event during an updating period in the Bearing condition is the sending from the sequence control unit 10, of a signal S1 to a switch 3 so that the inputs to amplifiers 6 and 7 are interconnected. The duration of the signal pulse S1 is indicated in FIG. 1a. A short time after the switch 3 has been closed, an operating pulse S3 is sent to the gain control unit 9, and to the phase control unit 12, so that the feedback loops are activated. The control pulse S3 is also applied to the signal evaluation circuit 5 for effecting compensation for quadrantal error. The gain of the amplifier 7 will be adjusted accordingly such that the gains of the amplifiers are "equal" and corrections for quadrantal errors are included. Simultaneousy, the phase of the signals are updated by using one of the two signals as reference.

During the relatively short updating periods, the CRT 4 is blocked by a signal S2 from the sequence control unit 10. This signal is necessary for preventing display of the updating result (45° + quadrantal error) on the CRT during updating periods. The updating is preferably undertaken during time periods on the order of 20 milliseconds with a repetition frequency of 30 periods per minute. Readings for the digital display 8 are taken between the updating periods and with reference to FIG. 1a, the positive portions of pulses S4 define times when those readings are taken.

A check of the updating adjustment is available by operating the switch 11 to its F-position. This switch is normally (i.e. during taking of bearings) in its B-position described above. In the F-position, the switch 3 is closed continuously for interconnection of the two amplifier inputs. The gain control unit 9 and the phase control unit 12 are also activated continuously and the CRT 4 is controlled so as to display 45° plus quadrantal error correction. This is displayed as a line of full CRT diameter. Simulataneously, the digital display 8 is controlled by the signals S4 and S5 so not to display that 45° plus quadrantal error.

It will be seen from the pulse diagram FIG. 1a, that in the Bearing condition the negative S4 pulse is wider than the positive S1, S2 and S3 pulses, so as to ensure that the updating period is well over, updated phase and gain adjustments having been made, before bearings are taken and displayed on the digital display 8. The phase and gain adjustments of the equipment remain relatively constant until the next updating period, represented by the next S3 pulse. The digital display 8 is controlled by signals S4, S5 and $\overline{S5}$, so that, in the Bearing condition, the S5 signal inhibits frequency information, the $\overline{S5}$ signal allows the bearing information and the S4 signal indicates that readings are taken between the short updating periods. Actually, the digital display 8 comprises a register which stores the information to be displayed and delivers this information to the display at certain intervals. The last displayed bearing information will remain displayed during the short updating periods and until new information is received from the register. Such a display is also adapted for frequency presentation, although not as a necessary part of the present invention.

As mentioned, the input to the CRT 4 will be blocked by the S2 signal during the short updating periods. The persistence of the tube phosphor screen will, however, keep the bearing information visible continuously when the direction finder is in its Bearing condition. The bearing is represented as a radius, the sense determination (the correct half diameter) being provided by the sense antenna. Sense determination is basically described in the aforementioned Terman handbook (page 885).

The circuitry of the overall device will be explained in detail in connection with FIGS. 2–5.

Figure 2:
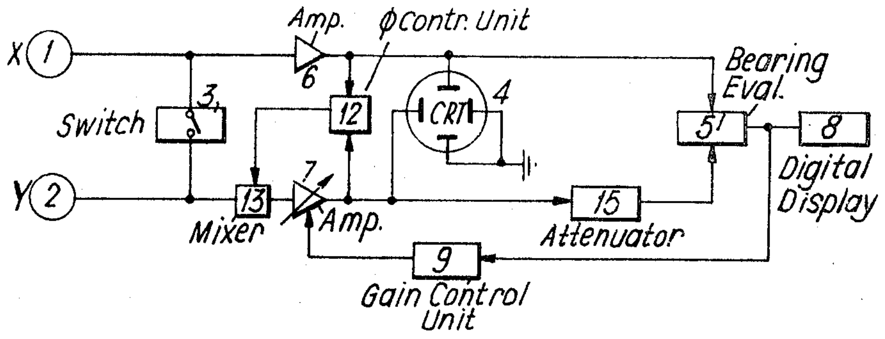
FIGS. 2 and 2*a* schematically show an embodiment of the quadrantal error compensating circuit.

In FIG. 2 is schematically shown an embodiment of the invention with further detail in respect to the quadrantal error correction loop. The sequential control is omitted from this diagram for simplicity. Blocks identical with the blocks shown in FIG. 1 are given the same reference numerals.

In FIG. 2, an attenuation circuit 15 (attenuator) is includPd in the lead from the output of the adjustable amplifier 7 to the signal evaluation circuit now called the bearing evaluator 5'. The attenuation circuit (attenuator) is controlled by the main sequence control (not shown) to be active during updating periods, and its attenuation preset in accordance with the desired quadrantal error correction. Briefly described, the attenuation circuit 15 eliminates the quadrantal error unequality introduced by the gain control unit 9. In other words, the gain control unit 9 controls the amplifier 7 so as to compensate for the attenuation introduced by the attenuation circuit 15. The signals presented to the bearing evaluator 5' will therefore, in this embodiment of the invention, be equal in amplitude, making digital comparison quite simple. Details of the bearing evaluator 5' and the gain control unit 9 will be described later. The digital display unit 8 may, during long updating periods, be controlled so as to display the frequency of the signals to which the two amplifiers (receivers) are tuned.

Figure 2A:
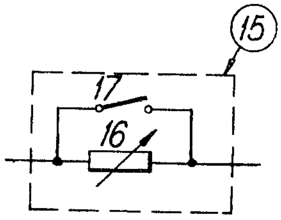

In FIG. 2a is shown a simple embodiment of the attenuation circuit 15 of FIG. 2. This circuit may be represented by a variable impendance 16, its value being preset to the desired quadrantal error correction. This value normally varies with frequency and the attenuation circuit should therefore be controlled to be preset to different values according to the frequency to which the system is tuned. A switch contact 17 indicates that the attenuation circuit is short circuited when bearings are taken. This operation is controlled by Jhe S3 signal from the sequence control unit 10, the contact 17 being either a relay contact or an electronic switch instrumented according to well-understood design methods.

The two signals, X and Y,are applied to the pair of plates in the cathode ray tube, and a line of 45° will appear on the tube screen when the two signals equal amplitude. In the bearing evaluator 5' the two signals are compared and there is generated a pulse signal, the duty cycle of which is 25 percent when the two signals have equal amplitude. The output signal from the bearing evaluator 5 is applied to digital display 8. The output signal from the bearing evaluator 5′ is also applied to the gain control unit 9, which again controls the gain of the amplifier 7.

As aforementioned, the amplifier 7 is controlled such that the quadrantal error is taken into account during updating. This is accomplished by means of the loop comprising the attenuation circuit 15, the bearing evaluator 5′, the gain control unit 9 and the amplifier 7. This loop operates in the following manner: Assume that the gain of both amplifiers are initially equal and that the attenuation circuit is set to 0° attenuation so that the output from the bearing evaluator 5 is a pulse signal with duty cycle equal to 25 percent. The length of the positive pulse therefore corresponds to 45° on the CRT 4. This pulse signal is applied to the gain control unit 9, which reacts on a 25 percent duty cycle signal by maintaining its status. When the attenuation circuit 15 is set to a value corresponding to a quadrantal error correction of 1°, the output from the bearing evaluator 5′ will be a pulse signal with a slightly shorter duty cycle. The gain control unit 9 racts on this shorter duty cycle by increasing the gain of the amplifier 7 correspondingly. The amplitude of output signals from the amplifiers 6 and 7 differs now by an amount corresponding to 1°. As before, 1° is effectively subtracted by the attenuation circuit 15 so that the signals applied to the bearing evaluator 5′ will be equal and its output will return to the 25 percent duty cycle whereby the gain control unit 9 maintains the new condition. The operation of this circuit will be explained in more detail in connection with description of FIGS. 3 and 5. If, however, for some reason, the gain of the amplifier 7 or the components and circuitry leading to the switch 3 should vary, such variation or altered gain will be detected by the bearing evaluator 5′ and the gain of the amplifier 7 will be controlled crrespondingly.

Figure 3:
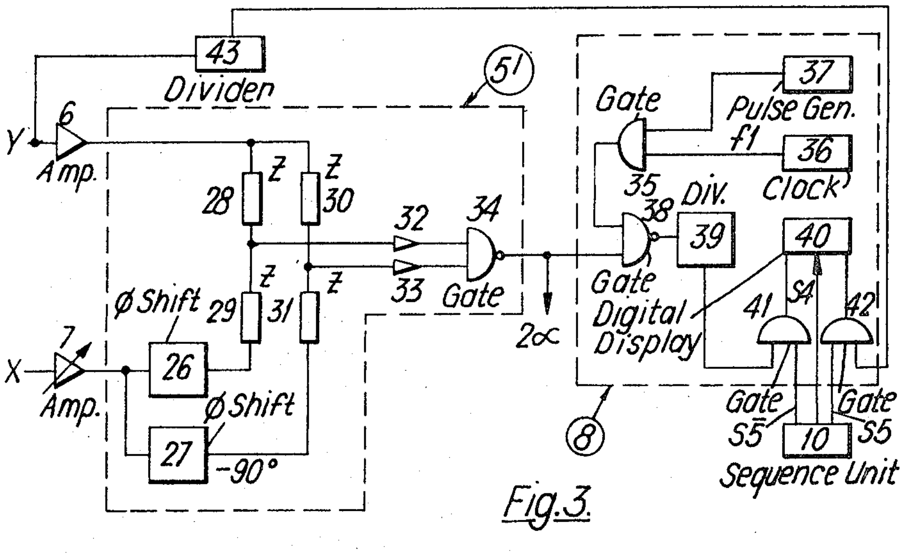
FIG. 3 shows a more detailed schematic of the bearing evaluator.

In FIG. 3 is shown a block schematic of the bearing evaluator 5′ of FIG. 2 and the digital display unit 8.

Figure 3A:
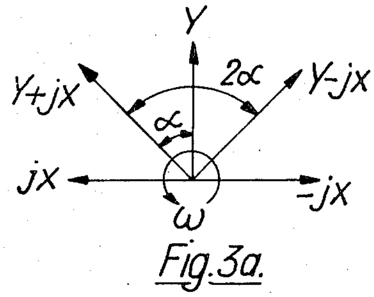
FIGS. 3*a* and 3*b* respectively show a vector diagram and waveform diagram for signals encountered in the device of FIG. 3.

The signal in the X-channel is shifted +90° in a phase shifting unit 26 and −90° in a phase shifting unit 27. The following addition in the impedance networks 28, 29 and 30, 31 is shown in the vector diagram, FIG. 3*a*. The vectors rotate with frequency $\omega$ so that the $y-jx$ signal lags the $y+jx$ signal by an angle $2\alpha$. When the amplitude of the two signals are equal, the angle $\alpha = 45°$.

Figure 3B:
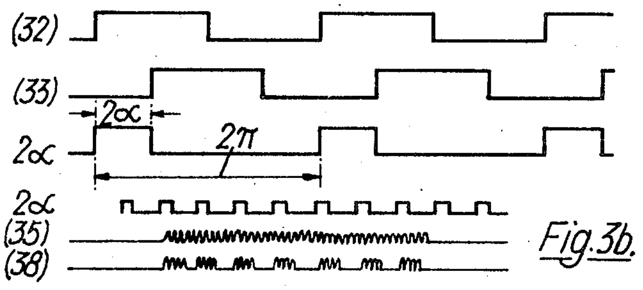

The signals $y+jx$ and $y-jx$ are passed through amplifiers 32 and 33, respectively, where the amplitudes are clipped such that their zero-crossings are maintained accurately. The resulting signals are indicated by waveforms (32) and (33), respectively, in FIG. 3*b*. The positive zero-crossing of $y+jx$ opns a date 34 and the following positive zero-crossing of $y-jx$ closes the gate. Expressed in radians the gate 34 is held open an interval $2\alpha$, the length of one complete period being $2\pi$. It will be seen that the bearing angle is directly presented as one half of the phase displacement between the signals $x+jy$ and $x-jy$. When $x$ and $y$ are equal, $\alpha = 45°$, $2\alpha = 90°$ ($\pi/2$) and the duty cycle of the clipped square wave signal from the gate 34 is 25 percent. The signal appearing at the output of the gate 34 (hereinafter called $2\alpha$-detector) is identical with the signal at the output of the bearing evaluator 5′ in FIG. 2.

The digital display is not a part of the present invention, but will nevertheless be described briefly for the benefit of the reader. To the input of a gate 35 there is applied a clock pulse signal fl from a clock pulse generator 36 and a gate signal corresponding for instance to 0.1 seconds. This gate signal is delivered from a pulse generator 37. The output signal from the gate 35 which corresponds to the total number of clock pulses appearing during the gate pulse, is gated with the output from the $2\alpha$ detector 34 in a gate 38. (Refer to the pulse diagram of FIG. 3b). The $2\alpha$-detector 34 permits a fraction $2\alpha°/360°$ to pass gate 38 and thus the total number of pulses from 38 is in direct proportion to $\alpha$(or $2\alpha$ , as it may be). Assuming the signal frequencies of X and Y (and the $2\alpha$-signal) to be approximately 20 kHz, the evaluation period 0.1 sec (gate 37), and the clock pulse frequency to be 10.8 MHz, the number of bursts for one evaluation period will be 2,000. The total number of clock pulses to gate 38 will be 1,080,000 and the total number of pulses passing gate 38 will be 270,000 when $2\alpha = 90°$. As previously mentioned, this corresponds to a line appearing at 45° on the CRT. In order to obtain the numbers 4–5–0 on the digital display 40 the signal will have to pass through a division circuit 39 in which it is divided by $6 \times 10^2$. On the digital display there is arranged a decimal point between the tenths and the units, so that the number appearing will be degrees and tenths of degrees, in this 45.0°.

Between the division circuit 39 and the digital display 40 there is indicated a gate 41 which is controlled by the $\overline{S5}$ signal from the sequence control unit 10. The bearing information is only applied to the digital display between updating periods, indicated by the signal S4. The digital display is further controlled by a gate 42 which is open only in the "Frequency" condition of the direction finder. Under control of the S5 signal (see FIG. 1*a*) the frequency of the tuned-in signal is displayed on the digital display 40. The frequency information may for instance be taken from one of the channels X or Y and handled in a division circuit 43 before the information is presented on the display.

Actually, the digital display 40 comprises a register which stores the information to be displayed and delivers this information to the display at certain intervals.

Figure 4:
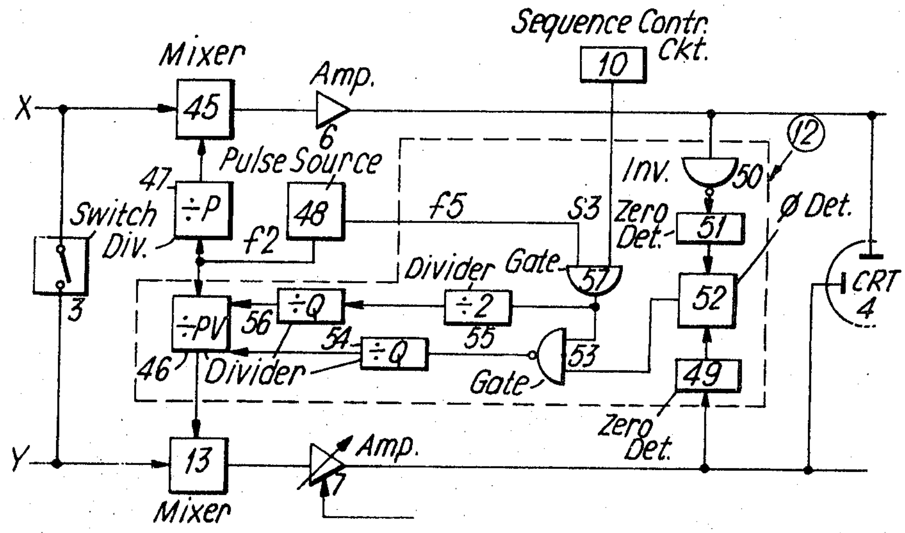
FIG. 4 schematically shows the phase control circuits.

In FIG. 4 the phase updating circuit 12 (associated with mixer 13) mentioned in connection with FIG. 1, is shown.

In the two channels there are included mixer circuits 13 and 45 for producing intermediate frequency (IF) signals. The input signals to the mixers 13 and 45 are mixed with signals from division circuits 46 and 47 respectively. In these division circuits a high frequency signal f2 from a pulse source 48 is divided by a variable number PV and a fixed number P respectively. When the frequency of the output signal from the division circuit 46 is varied, the phase of the Y signal presented to the amplifier 7 is also varied.

Figure 4A:
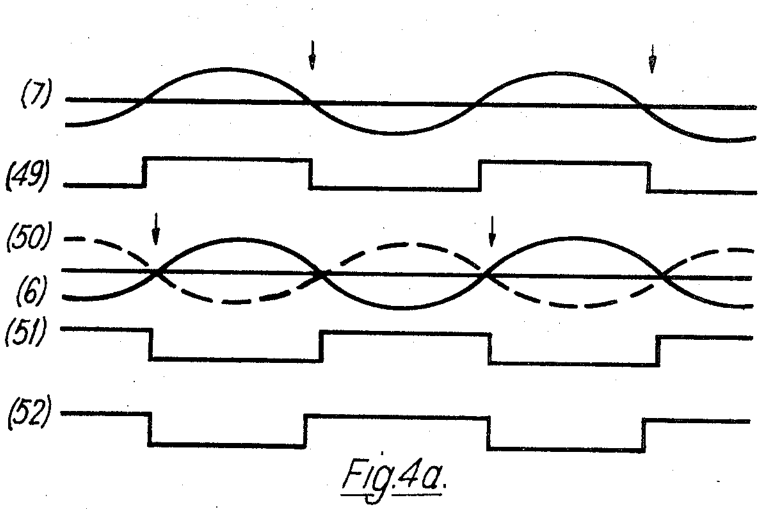
FIG. 4*a* shows the pulse diagram for FIG. 4.

The manner in which the divisor of the circuit 46 is varied will be described briefly hereinafter. The two sinus signals appearing at the output of the amplifiers 6 and 7 are indicated in the pulse diagram, FIG. 4a. The signal from the amplifier 7 is passed through a zero crossing detector 49 in which the negative zero crossing is determined with high accuracy. This is indicated by the arrows in the pulse diagram. The signal from the amplifier 6 is inverted in an inverter 50 before it is presented to a zero crossing detector 51 in which the negative zero crossings of this signal is determined with high accuracy. In a phase detecting circuit 52 there is produced a square wave signal, the duty cycle of which corresponds to the phase difference between the two signals. It will be seen that each of the edges of this signal is determined with high accuracy and that a signal with 50 percent duty cycle will indicate zero phase shift.

This square wave signal is gated by a high frequency signal f5 in a gate 53 so that 50 percent of the pulses passes this gate when the duty cycle is 50 percent. The output from gate 53 is fed to a division circuit 54 in which the pulse rate is divided by a number Q. Similarly, the high frequency signal f5 is supplied via a by-2 division circuit 55 and a by-Q division circuit 56 so that the pulse rate from the two circuits 54 and 56 will be equal, over a predetermined number of periods of the duty cycle signal from the phase detector 52, when the duty cycle Is 50 percent. These two outputs are applied to the variable division circuit 46, previusly mentioned, for varying the division number (divisor) when the duty cycle differs from 50 percent. Such variation is preferably effected in small steps by adding or subtracting pulses from the division circuit 46.

Observing the location of gate 57 in the circuit, it will be realized that the whole phase updating circuit is controlled by the S3 signal from the sequency control circuit 10.

Figure 5:
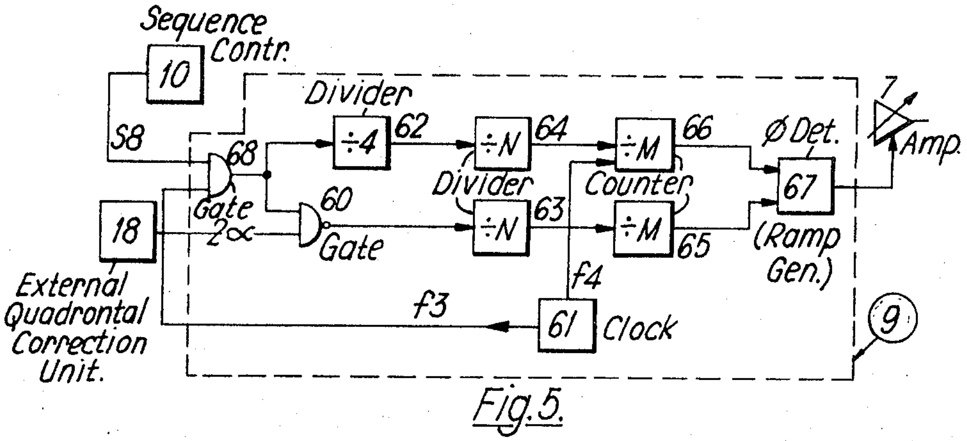
FIG. 5 schematically shows the gain control unit.
Figure 5A:
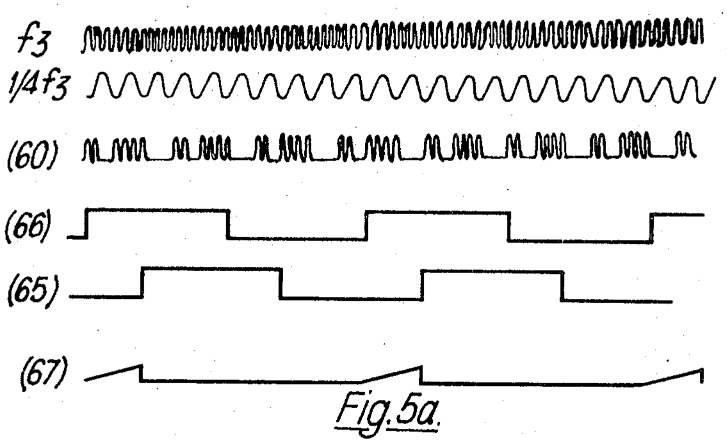
FIG. 5*a* shows the corresponding pulse diagram for FIG. 5.

In FIG. 5 the details of the gain control circuit 9 of FIGS. 1 and 2 are shown. The $2\alpha$-signal appearing at the output of the bearing evaluator 5' is applied to a gate 60. To the input of this gate is also applied clock pulses *f*3 from a clock pulse generator 61. At the output of the gate 60 there will appear bursts of clock pulses and when the duty cycle of the $2\alpha$-signal on the input is 25 percent, the number of clock pulses will be divided by 4 over a predetermined time. The clock pulses are also applied to a division circuit 62 which divides the pulse rate by 4. Over a predetermined time interval, corresponding to a number of periods of the $2\alpha$-signal, the number of clock pulses appearing at the output of the gate 60 and at the output of the division circuit 62 will be equal. These two pulse trains are further divided by a number N in division circuits 63 and 64 respectively. The outputs of these division circuits are applied to two counters 65 and 66 respectively, and will produce phase shifts in these counters. These counters are primarily triggered by clock pulses *f*4 from the clock pulse generator 61, so that there at the output of these counters will appear pulse trains of equal frequency, but with arbitrary phase. This is indicated in FIG. 5*a*. When the duty cycle of the $2\alpha$-signal appearing at the input of the gate 60, is 25 percent, the signals applied to the counters 65 and 66 from the division circuits 63 and 64 respectively have the same repetition frequency, so that these pulse signals will cause identical phase shift of the two output signals from the counters 65 and 66. These two output signals are applied to a phase detector or ramp generator 67. This ramp generator is triggered *on* by the positive edge of one of the signals and triggered *off* by the positive edge of the other signal. The output signal from the phase detector 67 is therefore an analog signal which may be used for controlling the gain of the amplifier 7. As long as the duty cycle of the $2\alpha$-signal appearing on the output of the quadrantal error correction unit 18 and applied to the gate 60 is 25 percent, the gain control signal appearing on the output of the phase detector 67 will have the same constant value. As previously indicated, however, the relative phase between the outputs from the counters 65 and 66 is initially arbitrary. This will result in an output signal from the phase detector 67 which will not give the amplifier 7 correct gain control. When the gain of the amplifier 7 is not correct, this will obviously result in a $2\alpha$-signal with duty cycle differing from 25 percent. As a result of this incorrect $2\alpha$-signal, the division circuit 63 will apply a number of trigger pulses to the counter 65, which is different from the number of pulses applied to the counter 66 by the division circuit 64. Correspondingly, the number of pulses applied to the counter 65 will be less than the number of pulses applied to the counter 66 when the duty cycle of the $2\alpha$-signal is less than 25 percent. In this way the phase of the output signal from the counter 65 will be automatically shifted until it reaches the desired value.

It will be seen from the above that when the gain of the amplifier 7 is controlled such that the quadrantal error is included, the feed back loop comprising the attenuation circuit 15, the bearing evaluator 5' and the gain control unit 9 will ensure that this condition is correct continuously or at predetermined intervals.

In FIG. 5 the sequence control unit 10 described in connection with FIG. 1 is also shown. From this unit 10 is delivered a signal S3 which enables a gate 68 during the updating periods. The clock signals f3 are blocked from reaching the gate 60 and the division circuit 62 outside these periods, so that the gain of the amplifier 7 will be maintained at the same fixed value between updating periods.

Figure 6:
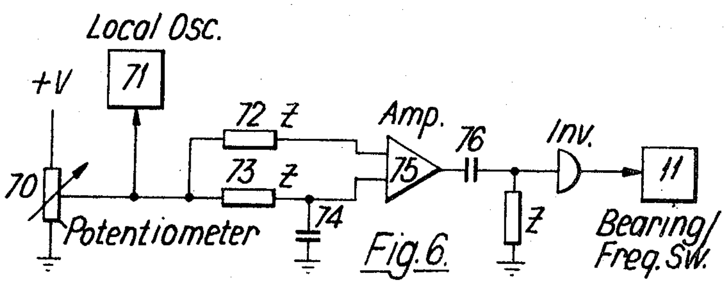
FIG. 6 shows a control arrangement for the Bearing/-Frequency switch.

In FIG. 6 is shown a circuit arrangement for control of the Bearing/Frequency switch 11 if the tuning arrangement 70 is operated when the direction finder is in its Bearing condition. The local oscillator 71 is a voltage controlled oscillator which gives a different output frequency for different settings of the tuning potentiometer 70. To the potentiometer 70 is also connected two Z impedance 72 and 73, the impedance 73 being connected to ground via a capacitor 74. If the tuning potentiometer 70 is adjusted, the signal presented to an amplifier 75 by the impedance 73 will be delayed relative to the signal presented by the impedance 72 resulting in a sudden change in the relationship between the two signals. At the output of the amplifier 75 said change will be enlarged, resulting in a high frequency pulse at the right hand side of a capacitor 76. This pulse ensures that the B/F switch 11 is switched to its F-position and maintained in this position until the switch is manually operated to its B-position.

It should be emphasized that the above detailed description of an embodiment of the invention must not be considered as a limitation of the scope of protection. It may, for just one variation, be practical in certain instances to interconnect both amplifiers to the sense antenna of the system instead of simply interconnecting the two loop antennas. Various other modifications falling within the scope of the invention will suggest themselves to those skilled in the art.

What is claimed is:

1. In a direction finder system which includes two direction-sensitive antennas and a paIr of corresponding receiver channels and means for selecting "Frequency" and "Bearing" modes of operation alternatively for tuning to selected signals and for making bearing determinations respectively, the combination comprising:

an amplifier gain controllable in response to a gain control signal, in a least one of said receiver channels;

a mixer circuit substantially at the input of each of said receiver channels for producing and applying IF signals in said channels, said gain controllable amplifier receiving IE signals from a corresponding one of said mixer circuits;

gain calibration updating means compqring the gains of said receiver channels and for applying a first control signal to said amplifier to produce gain equality in each of said channels;

phase calibration updating means including means responsive to the outputs of said receiver channels to detect phase errors introduced therein and for developing and applying a phase control signal to said mixer in the channel corresponding to said gain controllable amplifier;

and sequence control means for enabling said both gain and phase calibration means continuously during said Frequency mode of operation and intermittently during said Bearing mode of operation, said sequence control being arranged to parallel the inputs of said two receiving channels whereby the same input signal is applied to both of said channels during said Frequency mode of operation.

2. Apparatus according to claim 1 in which means for applying quadrantal error corrections are provided, said means comprising additional means for applying a second control signal for further modifying the gain of said gain controllable amplifier as a function of a predetermined quadrantal correction signal.

3. Apparatus according to claim 2 in which said means for applying quadrantal error corrections comprises an attenuator in series with the output of said receiver channel having said gain controllable amplifier in the feedback path for controlling said gain controllable amplifier, thereby to provide an offset between said channel outputs representative of said quadrantal error correction.

4. Apparatus according to claim 1 in which said sequence control unit is adapted to interrupt bearing determination during said "Bearing" mode of operation for a period on the order of 20 milliseconds every other second, whereby said channel inputs are paralleled for determination and application of said gain and phase corrections during said "Bearing" mode of operation.

5. Apparatus according to claim 4 and additional means comprising a cathode ray display having first and second orthogonal beam deflection element pairs, means connecting the output of said receiver channel which includes said gain controllable amplifier to said first beam deflection element pair and the other receiver channel output to said second deflection element pair, means controlling said display to present an indication constituting a visual check on said gain and phase updating substantially only during said "Frequency" mode of operation.

6. Apparatus according to claim 5 in which said display presents a full diameter line at a 45° angle modified by an angle corresponding to the quadrantal error supplied and corresponding to the particular frequency to which said system is tuned at any time.

7. Apparatus according to claim 5 in which the bearing readings determined during said "Bearing" mode of operation are presented on said cathode ray display as a radius line and said display includes a bearing scale about the face circumference of said display.

8. Apparatus according to claim 1 in which said direction sensitive antennas are defined as disposed with their null receiving angular positions mutually 90° apart in the plane of bearing determination, bearing evaluation means are included for generating a signal representative of the bearing angle of received radiant energy from the relative amplitudes of signals in said receiver channels, and means are included for converting said bearing determination to digital form for presentation on a digital display.

* * * * *